United States Patent [19]

Young

[11] Patent Number: 5,114,105
[45] Date of Patent: May 19, 1992

[54] ELECTRICAL BOX SUPPORT BRACKET

[76] Inventor: John A. Young, 10988 Woodbine Avenue, Markham, Ontario, Canada, L6C 1J5

[21] Appl. No.: 611,890
[22] Filed: Nov. 8, 1990
[51] Int. Cl.[5] .............................................. E04G 3/00
[52] U.S. Cl. .................................... 248/27.1; 248/906
[58] Field of Search ............... 248/27.1, 57, 300, 906; 174/48, 63

[56] References Cited

U.S. PATENT DOCUMENTS

| | | |
|---|---|---|
| 1,056,759 | 3/1913 | Mallery . |
| 1,156,885 | 10/1915 | Caine .................................... 248/906 |
| 1,211,182 | 1/1917 | Kruse . |
| 1,288,024 | 12/1918 | Kendig . |
| 1,583,474 | 5/1926 | Kruse . |
| 1,790,031 | 1/1931 | Vaughn .................................. 248/906 |
| 1,982,957 | 12/1934 | Knell . |
| 2,269,211 | 1/1942 | Kuykendall ........................... 248/906 |
| 2,881,924 | 4/1959 | Kruse et al. . |
| 3,168,612 | 2/1965 | Sorenson . |
| 3,365,156 | 1/1968 | Beck . |
| 3,528,636 | 9/1970 | Schmidt . |
| 4,757,967 | 7/1988 | Delmore ............................... 248/27.1 |

Primary Examiner—Ramon O. Ramirez
Assistant Examiner—Robert A. Olson
Attorney, Agent, or Firm—Ridout & Maybee

[57] ABSTRACT

An electrical box support bracket for adjustably supporting one or more electrical outlet boxes of the kind having parallel mounting flanges on the top and bottom sides. The bracket consists of a plate with a rectangular opening having channels at the top and bottom edges for snugly and slidably receiving the said flanges of electrical boxes. Furthermore, the bracket may have metal tabs for easy and rapid attachment to metal wall studs.

6 Claims, 2 Drawing Sheets

ELECTRICAL BOX SUPPORT BRACKET

The present invention relates to building construction and more particularly, to support brackets used in wall construction to hold electrical outlet boxes, to which electrical apparatus, for example switches and power receptacles, may be attached.

Interior walls in buildings commonly use vertical studs of timber or of channel section sheet metal with wall board being attached by screws, for example self tapping sheet metal screws. This is commonly called a drywall.

This type of wall construction poses a problem for the installation of electrical fixtures, such as electrical outlet boxes. Electrical boxes are generally mounted between adjacent drywall studs either by attachment to a stud directly or to a wooden cross-piece spanning the studs. In either case, the installation is time consuming and in some cases, a row of electrical boxes may not be horizontally aligned with the floor.

U.S. Pat. No. 1,211,182, issued Jan. 2, 1917, disclose a mounting strip for electrical boxes of the type with top and bottom flanges. Each mounting strip consists of a folded metallic plate forming a channel where the top and bottom flanges of electrical boxes are held securely by a series of bosses on the back wall projecting towards the front wall. Two separate mounting strips are required for mounting an electrical box or a set of electrical boxes. The mounting strips were intended for attachment to wooden wall studs by nails.

However, this arrangement is still labour intensive: after securing the flanges at one end of a box or boxes to the bosses on one strip, the strip is nailed to the studs, the second strip is applied parallel to the first strip and the flanges at the opposite end of the boxes are manipulated to secure them to the bosses on the second strip which is then nailed to the studs. Once the electrical boxes are mounted and held by two mounting strips no further electrical boxes can be added without removing a mounting strip, and the boxes can be installed only at the predetermined intervals occupied by the bosses.

In view of the foregoing, it is an object of the invention to reduce the labour required to install electrical boxes and to provide a support bracket with a low manufacturing cost.

The invention consists of a plate for spanning and attaching to wall studs. It has a rectangular opening with means defining thin channels along the upper and lower edges. The channels snugly and slidably receive the top and bottom mounting flanges, respectively, of electrical boxes.

Each electrical box can slide freely to the desired position along the channels in the rectangular opening, and is infinitely adjustable in position.

Each thin channel may also have a notch in its front wall through which a respective flange can be pressed rearwardly into or can be withdrawn forwardly from said channel. The notches on a bracket may be mutually staggered. The back wall of the channel adjacent to each notch may have at least one longitudinally elongated hole through which screws may be passed to retain a mounting flange of an electrical box.

The plate and the channels may be formed of a malleable metal whereby an electrical box can be retained in any selected position by crimping the channel walls to engage tightly on the flange retained thereby. Furthermore, the plate may also have malleable metal tabs provided adjacent opposite ends of the rectangular opening which may be bent over to engage the edge of the wall studs. The tabs are preferably parallel to one another and perpendicular to the adjacent edge of the plate. Each metal tab may also have aligned cutouts on opposite longitudinal edges to facilitate bending about transverse lines.

FIG. 3 is a sectional view taken on the line 3—3 in FIG. 1.

Figure 1:
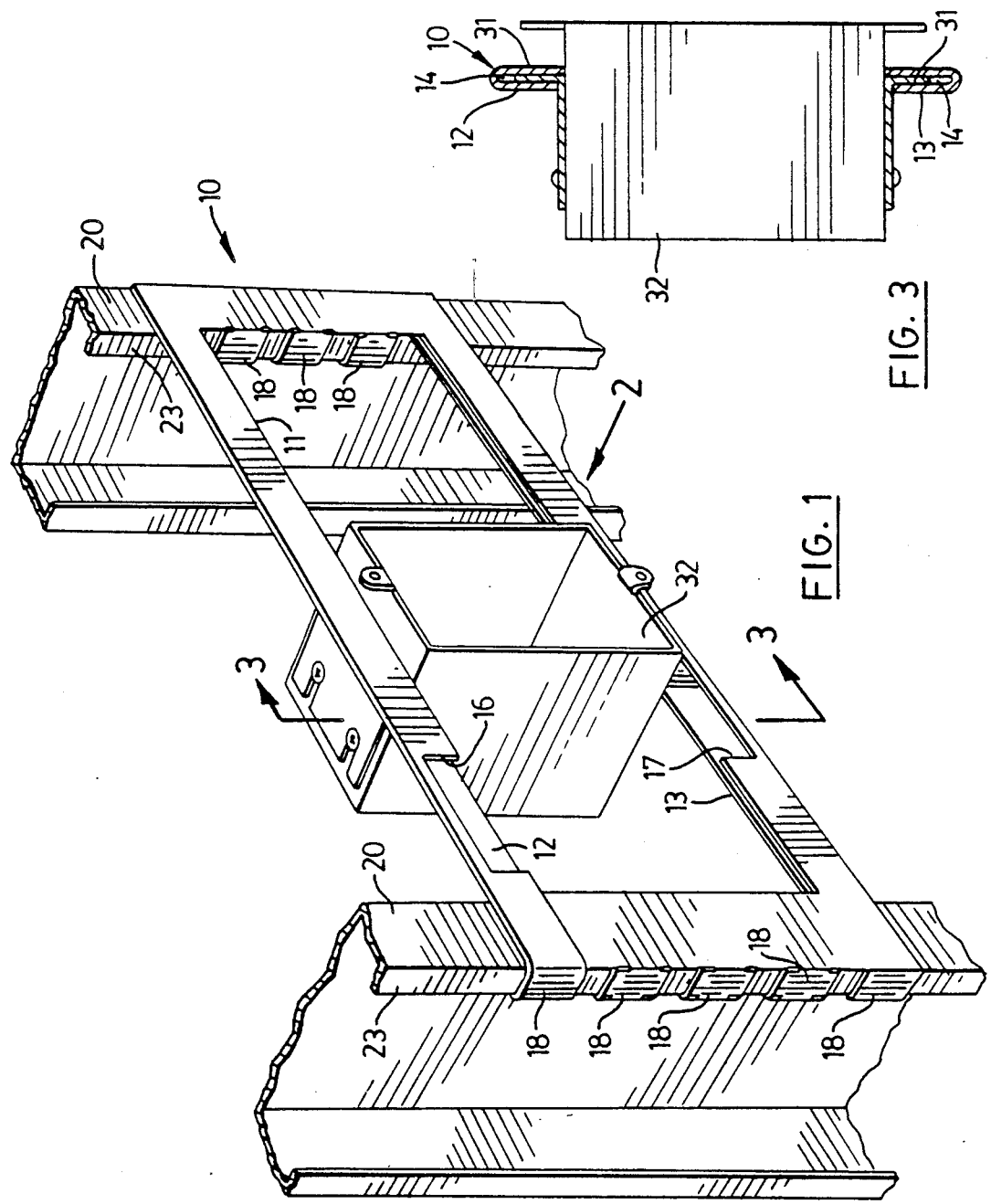
FIG. 1 is a perspective view showing the preferred embodiment of this invention attached to the wall studding.
Figure 2:
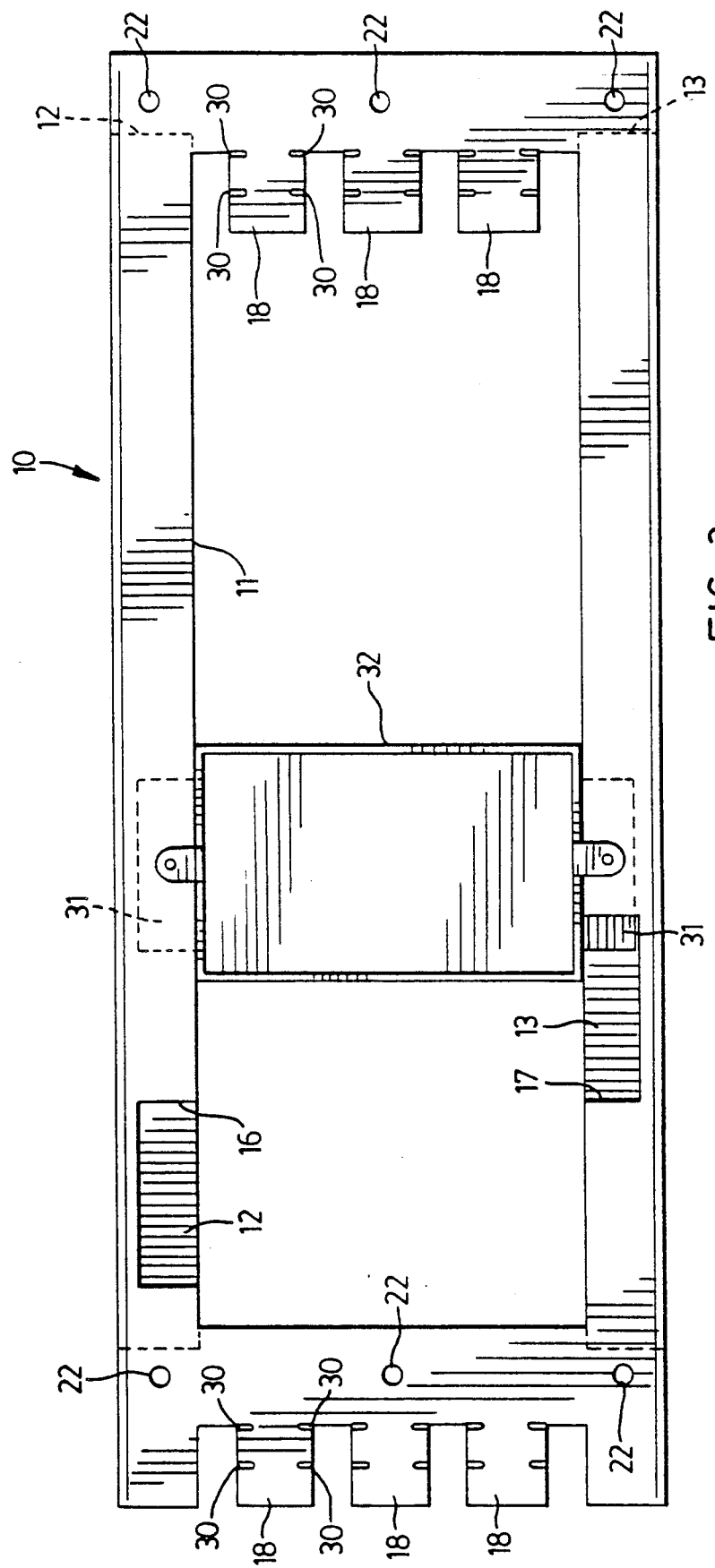
FIG. 2 is a front view on line 2 in FIG. 1 showing the preferred embodiment of this invention supporting an electrical box.

The bracket is preferably made of malleable sheet metal, for example galvanized thin sheet steel, but it may be composed of any fairly rigid malleable material. Referring to the drawings, in the embodiment of the invention shown, these brackets can be manufactured by stamping sheet metal to create the required blanks: plate 10. As shown, each plate 10 has a rectangular opening 11 in the center. The upper and lower sides of the stamped blank have laterally extending edge portions 12 and 13 which are folded over to define thin channels 14 extending along the upper and lower edges of opening 11. The stamped blank also includes notches 16 and 17 at mutually staggered positions on the upper and lower edges of opening 11 providing openings into each thin channel 12 for the insertion of electrical boxes. Furthermore, metal tabs 18 are provided on the blank adjacent opposite ends of the rectangular opening.

The rectangular opening 11 spans the space between adjacent wall studs 20 (usually 16 inches). The width of each end portion 21 of the blank should preferably be the same as a conventional metal channel wall stud 20. A number of holes 22 may be formed in each end portion 21 for attachment to the wall studs 20 using self tapping screws or by nailing or screwing in the case of wooden wall studding.

The bracket may be easily and rapidly attached to channel section wall studs 20 using the metal tabs 18. By aligning the vertical sides of opening 11 with the edges of wall studs 20, the bracket and any attached electrical boxes would automatically be horizontally aligned; they would be parallel with the floor, assuming the wall studs 20 have been constructed perpendicular to the floor. After alignment, the bracket can be retained by bending the metal tabs 18 to engage the re-entrant lip flanges 23 of the channel sides of the wall studs 20. To further secure the bracket to the wall studs 20, screws may be passed through holes 22 as mentioned above.

A number of metal tabs 18 may be provided on each end portion 21. Preferably the metal tabs 18 are provided at one end on an inner side of the end portion 21 and at the opposite end on the outer side of the end portion 21, as shown so that they can engage the lip flanges of adjacent channel section wall studs which conventionally are erected with all the channel openings in a wall facing in the same direction as shown. Each metal tab 18 may have aligned cutouts 30 on opposite longitudinal edges to facilitate bending about transverse lines. Preferably, each metal tab 18 should have two sets of aligned cutouts 30: firstly, at the edge of the respective end portion 21 for bending rearwardly of the channel side of a wall stud 20; and, secondly, at a certain distance along the metal tab for bending around a distal edge of the lip flange 23. The size of each cutout would depend on the desired size of the metal tabs. Preferably the metal tabs are approximately the width of a thumb with sufficient length to bend around the lip flanges 23 of the wall studs 20.

As can be seen from FIG. 3, each thin channel 14 has sufficient width and depth for receiving a mounting flange 31 of a conventional form of electrical box 32 to slide freely in the channel 14. Furthermore, the dimensions of each of the notches 16 and 17 are slightly larger than the mounting flanges 31 in order for the respective flange to engage into or disengage from the thin channel 14. Merely by way of example, one notch 16 may be half an inch away from the side of opening 11, and the other notch 17, two and a quarter inches away from the said side.

Each electrical box can be held at the desired position on the bracket by crimping the walls of the channel 14 to engage tightly on the flange 31 retained thereby. Also, the back wall 12 and 13 opposite each notch 16 and 17, respectively, may have has at least one longitudinally elongated hole or slot (not shown) through which screws may be passed to retain a mounting flange 31 of an electrical box. The longitudinally elongated holes or slots should span the length of the notches 16 and 17, respectively.

In use, after applying the bracket to the front of an adjacent pair of studs, and securing the bracket using the tabs 18 and/or screws or nails passed through the holes 22. The upper mounting flange 31 of a box 32 may be pressed rearwardly through the notch 16 to enter channel 14, following which it may be slid sideways until the lower flange 31 is in register with lower notch 17. The flange 31 may then be pressed rearwardly through notch 17 to enter the lower channel 14 and the box may then be slid sideways to a desired position and retained by crimping the plate 10 together with the upper and lower edge portions 12 and 13 inwardly, for example using pliers, to engage tightly on the upper and lower flanges 31 and lock the box 32 in place. Similarly, further boxes may be fitted to and located on the bracket following the above procedure to build up a multiple box arrangement. Boxes positioned with their flanges 32 in register with notch 16 or 17 may be held in place with a screw passed through the hole conventionally provided in the mounting flanges and through the hole or slot provided in the edge portions 12 and 13 adjacent the notches 16 and 17. Application of gypsum wallboard or the like and construction of the wall can then continue in the conventional manner.

The present invention is not limited to the features described and illustrated, but includes all variations and modifications within the scope of the claims. For example the notches 16 and 17 may be formed in the edge portions 12 and 13. The bracket of this embodiment would therefore normally be employed with the face having the folded over edge portions 12 and 13 on it facing outward from the wall studs 20.

I claim:

1. An electrical box support bracket for adjustably supporting one or more electrical boxes of the kind having thin parallel mounting flanges on their top and bottom sides, comprising a plate for spanning and attaching to the front sides of wall studs, a rectangular opening in the plate, and means defining thin channels along the upper and lower edges of the opening for snugly and slidably receiving said top and bottom mounting flanges, respectively, of said electrical boxes, whereby said electrical boxes can be slid freely along said rectangular opening to desired positions and wherein each channel has a notch in its front wall through which a respective flange can be pressed rearwardly into or can be withdrawn forwardly from said channel.

2. A bracket as claimed in claim 1 wherein said notches are mutually staggered, whereby a flange can be engaged into or disengaged from a channel then the electrical box slid to the other notch where the other flange can be engaged into or disengaged from the other channel.

3. A bracket as claimed in claim 1 wherein the back wall of the channel adjacent of each notch has at least one longitudinal elongated hole through which screws may be passed to retain a mounting flange of an electrical box.

4. A bracket as claimed in claim 1 wherein said plate and channels are formed of malleable metal whereby an electrical box can be retained in a selected position by crimping the channel walls to engage tightly on the flange retained thereby.

5. An electrical box support bracket for adjustably supporting one or more electrical boxes of the kind having thin parallel mounting flanges on their top and bottom sides, comprising a plate for spanning and attaching to the front sides of wall studs, a rectangular opening in the plate, and means defining thin channels along the upper and lower edges of the opening for snugly and slidably receiving said top and bottom mounting flanges, respectively, of said electrical boxes, whereby said electrical boxes can be slid freely along said rectangular opening to desired positions and wherein said plate is formed of malleable metal and has a first set of malleable metal tabs on and extending from one end of the plate, and a second set of malleable metal tabs on an edge of said opening remote from said one end and extending in the same direction as the tabs of said first set, whereby the tabs can be bent over to engage the edges of adjacent channel section wall studs each having their channel openings facing in said direction.

6. A bracket as claimed in claim 5 wherein each metal tab has aligned cutouts on opposite longitudinal edges to facilitate bending about lines parallel to said aligned cutouts.

* * * * *